US012717852B2

(12) United States Patent
Akkiraju Venkata et al.

(10) Patent No.: US 12,717,852 B2
(45) Date of Patent: Aug. 25, 2026

(54) CONTENT ENRICHMENT OF DOCUMENT DATA AND DATA SOURCE CONNECTOR CONTENT THAT IS INDEXABLE AND SEARCHABLE ACROSS VARIOUS SEARCH CLIENTS

(71) Applicant: Microsoft Technology Licensing, LLC, Redmond, WA (US)

(72) Inventors: Chandrasekhar Subramanya Akkiraju Venkata, Woodinville, WA (US); Rakesh Chakari Mallareppa, Bothell, WA (US); Rohit Sharma, Issaquah, WA (US); Bo Wang, Kirkland, WA (US); Kailun Qian, Kirkland, WA (US); Joel Ramos-Munoz, Redmond, WA (US); Luana Martins dos Santos, São Paulo (BR); Kishore Seralathan, Bothell, WA (US); Venkata Surya Lakshmi Jogi Raju Vegiraju, Redmond, WA (US); Anick Saha, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/341,182

(22) Filed: Jun. 26, 2023

(65) Prior Publication Data

US 2024/0427823 A1 Dec. 26, 2024

(51) Int. Cl.
*G06F 16/951* (2019.01)
*G06F 16/9532* (2019.01)

(52) U.S. Cl.
CPC ........ *G06F 16/951* (2019.01); *G06F 16/9532* (2019.01)

(58) Field of Classification Search
CPC ........................... G06F 16/951; G06F 16/9532
See application file for complete search history.

(56) References Cited

U.S. PATENT DOCUMENTS 6,252,587 B1 * 6/2001 Purple .................... G06F 9/451 717/109
7,555,493 B2 * 6/2009 Khayter ................. G06F 16/27 707/999.102

(Continued)

FOREIGN PATENT DOCUMENTS

KR 20080041757 A 5/2008
KR 101641304 B1 * 7/2016

OTHER PUBLICATIONS

International Search Report and Written Opinion received for PCT Application No. PCT/US2024/031515, Aug. 28, 2024, 20 pages.

(Continued)

*Primary Examiner* — Cheyne D Ly

(57) ABSTRACT

Systems and methods are provided for implementing content enrichment of document data and data source connector content. A computing system extracts enrichment data associated with a data item and ingests the extracted enrichment data within a data store, by indexing the extracted enrichment data in a search index of the data store. Indexing the extracted enrichment data includes generating a listing within the search index, the listing being generated to be searchable and refinable using a search engine, the extracted enrichment data being retrievable via the search engine. At least a portion of the enrichment data is generated using a large language model. The enrichment data may be stored in an enrichment data field in a schema file of the data item, in some cases, after the schema file has been modified to add the enrichment data field if not already contained in the schema file.

20 Claims, 8 Drawing Sheets

(56) References Cited

U.S. PATENT DOCUMENTS

| | | | | |
|---|---|---|---|---|
| 8,346,753 | B2 * | 1/2013 | Hayes | G06F 16/951 707/711 |
| 10,182,054 | B2 * | 1/2019 | Palmer | G06F 21/10 |
| 10,884,828 | B2 * | 1/2021 | Deligia | G06F 16/164 |
| 11,475,024 | B2 * | 10/2022 | Sriharsha | G06F 17/18 |
| 2002/0039101 | A1 * | 4/2002 | Fernandez | G06F 9/451 345/581 |
| 2006/0018506 | A1 | 1/2006 | Rodriguez | |
| 2014/0280179 | A1 * | 9/2014 | Coleman | G06F 16/3323 707/740 |
| 2019/0057122 | A1 * | 2/2019 | Kapulovskaya | G06F 16/2272 |
| 2020/0242632 | A1 | 7/2020 | Pogrebezky | |
| 2020/0394260 | A1 * | 12/2020 | Wu | G06F 16/953 |
| 2022/0121640 | A1 * | 4/2022 | Zimmerman | G06F 16/213 |

OTHER PUBLICATIONS

International Preliminary Report on Patentability (Chapter I) received for PCT Application No. PCT/US2024/031515, Jan. 8, 2026, 17 pages.

* cited by examiner

Figure 2B:
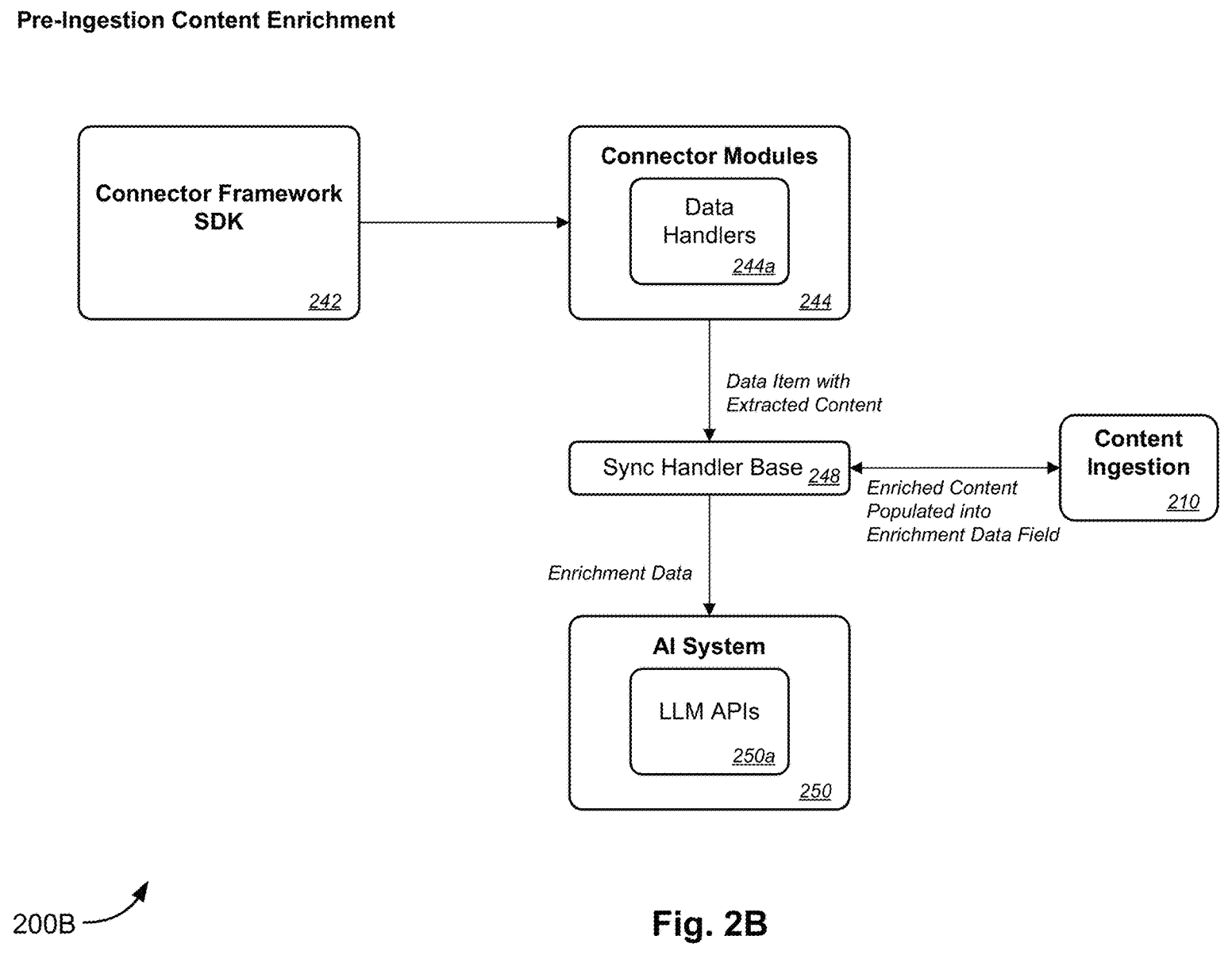

Pre-Ingestion Content Enrichment

Connector Framework SDK 242

Connector Modules 244

Data Handlers 244a

Data Item with Extracted Content

Sync Handler Base 248

Content Ingestion 210

Enriched Content Populated into Enrichment Data Field

Enrichment Data

AI System 250

LLM APIs 250a

CONTENT ENRICHMENT OF DOCUMENT DATA AND DATA SOURCE CONNECTOR CONTENT THAT IS INDEXABLE AND SEARCHABLE ACROSS VARIOUS SEARCH CLIENTS

BACKGROUND

Search of data files using a search utility typically does not include pre-ingested enrichment of the data files. Enrichment of data items thus need to be implemented at runtime during a search, which typically adds latency to implementing the search. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for content enrichment of document data and data source connector content and/or provides a search engine results page ("SERP") system that receives user search query from a search utility and that presents the document data and data source connector content along with enrichment data associated therewith within a user interface ("UI") of the SERP. In examples, a computing system extracts enrichment data associated with a data item and ingests the extracted enrichment data within a data store, by indexing the extracted enrichment data in a search index of the data store. Indexing the extracted enrichment data includes generating a listing within the search index, the listing being generated to be searchable and refinable using a search engine, the extracted enrichment data being retrievable via the search engine. At least a portion of the enrichment data (e.g., summarization data, classification data, etc.) is generated using a large language model ("LLM"). The enrichment data may be stored in an enrichment data field in a schema file of the data item, and based on a determination that a schema file of the data item does not already contain an enrichment data field, the schema file is modified to add one or more enrichment data fields.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 2B and 2C depict block diagrams illustrating example data flows for implementing pre-ingestion content enrichment and post-ingestion content enrichment.

DETAILED DESCRIPTION OF CERTAIN EMBODIMENTS

Figure 1:
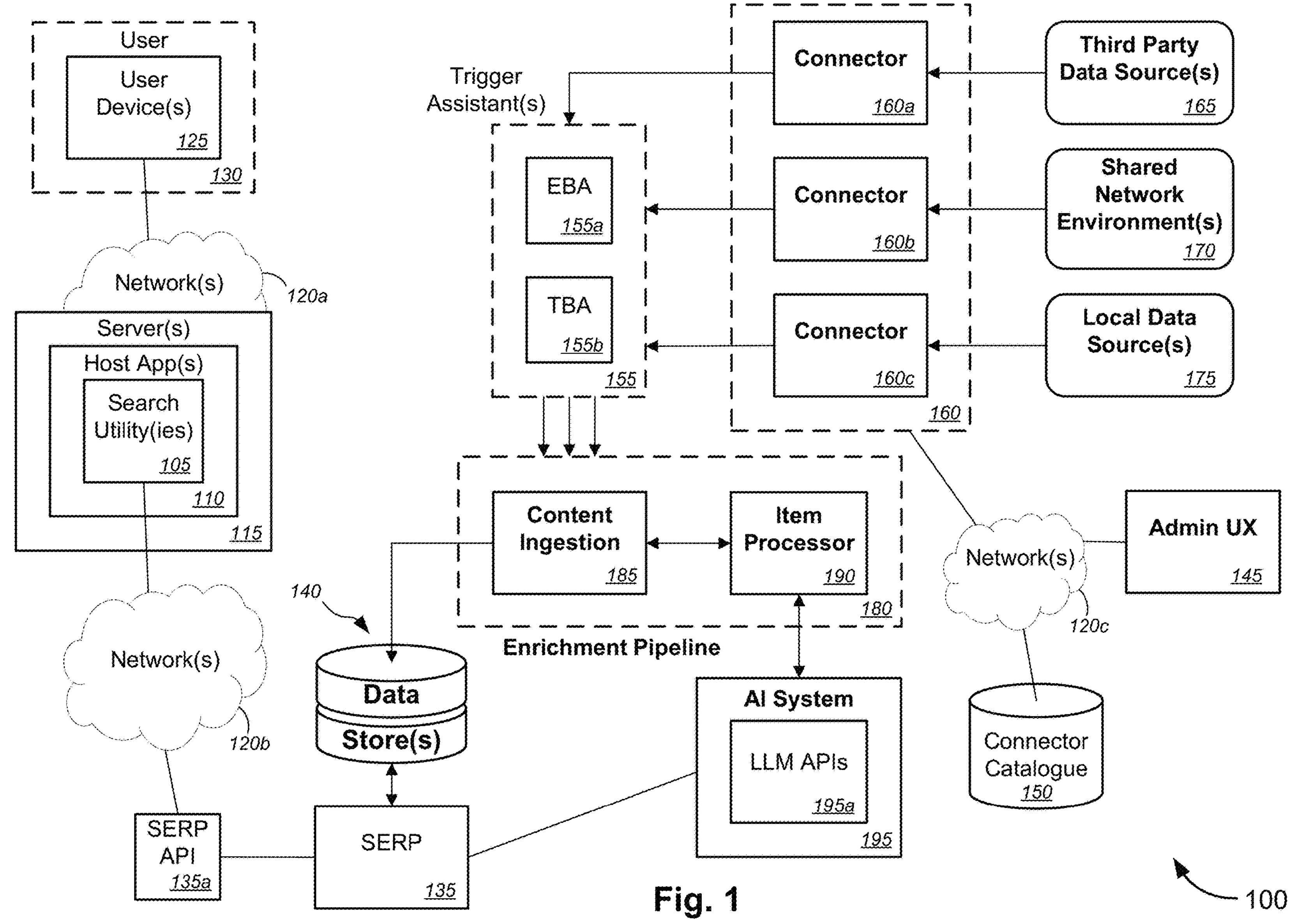
FIG. 1 depicts an example system for implementing content enrichment of document data and data source connector content.

A search utility that is used to query, and present results, for data files typically does not include pre-ingested enrichment of the data files, thus requiring enrichment being implemented at runtime during a search, which typically adds latency to implementing the search.

As briefly described above, a computing system implements content enrichment of document data and data source connector content. In examples, as content is ingested into a data source or a search index of the data source, the content and other metadata may be run through an enrichment pipeline either via a tenant specific model hosted in an AI system (e.g., OpenAI®) or a platform subscription managed resource to extract data enrichments and to ingest the data enrichments. In some examples, the content or data items may each include a word processor document file, a spreadsheet document file, a presentation document file, a drawing document file, a printable format document file, an email data file, a calendar data file, a contact list document file, a contact lead document file, a database item document file, a web document file, an image file, or a video file. For drawing document files, printable format document files, image files, video files, and/or other files that are not text-based files, optical character recognition ("OCR") and/or text extractable functionalities can be used to extract content of these images run through the enrichment pipeline. In some cases, the data enrichments include summarizations, classification, sentiment analysis of content, entity extraction, and more.

In the case that base schemas of data files (e.g., files, sites, emails, or other data files) and/or base schemas of generic connector entities (or external entities) do not already contain enrichment properties or enrichment data fields, the base schemas of these data files and/or entities may be modified to add the enrichment properties or enrichment data fields, which are then used to hold or store the enrichment data for these entities. In some cases, the enrichment data storage in the enrichment properties or enrichment data fields may be performed with an AI system (e.g., using a large language model ("LLM")), to capture summarizations and other enrichments. Whenever the content or data files change, event-based assistants ("EBAs") and/or time-based assistants ("TBAs") may be used to update the data enrichments with updated content.

Given that the data enrichments are searchable and retrievable properties in the search index, once the data enrichments have been indexed, the data enrichments can be served for any query. Such query may include queries like "summarize my unread emails over the last month," or "summarize documents related to Project X," and so on, without needing to run enrichments at runtime during the search, which minimizes the latency incurred by run-time enrichments. In examples, adaptive cards may be used to hold the enrichment properties or enrichment data fields to be displayed or presented on a search engine results page ("SERP") when the user searches in any SERP clients or search utility clients or data store search services.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of a method, system, and apparatus for implementing search utility functionality, and, more particularly, to methods, systems, and apparatuses for implementing content enrichment of document data and data source connector content, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing content enrichment of document data and data source connector content. System 100 includes one or more search utilities 105 that are associated with corresponding one or more host apps 110. The host apps 110 may each be hosted or operated on a server(s) 115. The search utilities 105, the host apps 110, and/or servers 115 may communicatively couple, via one or more networks 120*a*, with one or more user devices 125 associated with a user 130. The search utilities 105, the host apps 110, and/or servers 115 may also communicatively couple, via one or more networks 120*b*, with a SERP system 135, via SERP application programming interface ("API") 135*a*. System 100 further includes one or more data stores 140, an administrator ("admin") UX 145, a connector catalogue 150, and/or one or more trigger assistants 155. In some cases, the one or more trigger assistants 155 include an EBA 155*a* and/or a TBA 155*b*. The EBA 155*a* is configured to determine update of data items, to extract data items or updates to the data items, to determine update of content associated with the data items, and/or to extract the content or updates to the content, in response to event-based triggers. In some examples, the event-based trigger includes one of a user input being received requesting extraction of the enrichment data, a new data item being added, the data item being updated or changed, or a related data item being added, updated, or deleted. The TBA 155*b* is configured to determine update of data items, to extract data items or updates to the data items, to determine update of content associated with the data items, and/or to extract the content or updates to the content, in response to time-based triggers, in some cases, even if the event-based triggers are missed or otherwise not triggered. In examples, the time-based trigger includes at least one of a set date, a set day of a week, a set time of a day, or a set repeating period.

In some examples, system 100 further includes one or more connector frameworks 160, including connectors 160*a*, 160*b*, and/or 160*c*. System 100 further includes one or more third party data sources 165, one or more shared network environments 170, and/or local data sources 175. System 100 further includes enrichment pipeline 180, including content ingestion system 185 and item processor 190. System 100 further includes AI system 195, which includes LLM APIs 195*a*. In examples, Admin UX 145 communicatively couples to connector catalogue 150 and connector framework(s) 160 via network(s) 120*c*. In some cases, networks 120*a*, 120*b*, and 120*c* may be the same network(s) or same group of networks. In other cases, networks 120*a*, 120*b*, and 120*c* may be separate networks or separate groups of networks. Networks 120*a*, 120*b*, and 120*c* (collectively, "network(s) 120") may each include at least one of a distributed computing network, such as the Internet, a private network, a commercial network, or a cloud network, and/or the like.

In some instances, the one or more user devices 125 may each include one of a desktop computer, a laptop computer, a tablet computer, a smart phone, a mobile phone, or any suitable device capable of communicating with network(s) 120*a* or with servers or other network devices within network(s) 120*a*. In some examples, the user devices 125 may each include any suitable device capable of communicating with at least one of the search utilities 105, the host apps 110, and/or the servers 115, and/or the like, via a communications interface. The communications interface may include an app-based portal (e.g., app UI hosted on server(s) 115) or a web-based portal, an API, a server, an app, or any other suitable communications interface (not shown), over network(s) 120*a*. In some cases, user 130 may include an individual, a group of individuals, or agent(s), representative(s), owner(s), and/or stakeholder(s), or the like, of any suitable entity. The entity may include a private company, a group of private companies, a public company, a group of public companies, an institution, a group of institutions, an association, a group of associations, a governmental agency, or a group of governmental agencies.

In examples, the one or more search utilities 105 is configured to receive user search queries from user device(s) 125 and to relay the user search queries to the SERP system 135 via SERP API 135*a*. In some examples, although not shown in FIG. 1, the SERP system 135 includes a router, a router state history, one or more query builders, one or more query executors, a query cache, and a component renderer. Host app(s) 110 each hosts corresponding search utilities 105 and configures the router of the SERP system 135 by sending configuration data to the router. The configuration data defines search verticals, which are focused views of content types that are displayed in a UI of the search utility. The router provides the user search query and location information to a query builder(s), the location information describing a view of SERP 135 that is derived from a current URL corresponding to the SERP 135 and that is a representation of a location to which a user can navigate. The router state history stores current states of the router. The query builder(s) constructs a query request corresponding to the user search query, based on the provided user search query and location information. A query executor(s) executes the query request, in some cases, by retrieving query results from the query cache, while in other cases, by executing the query request to produce the query results. The component renderer renders one or more UX components within the SERP based on the query results.

In examples, the data store(s) 140 stores data items and enrichment data for the data items. Admin UX 145 provides an administrator with options and tools for accessing connector catalogue 150 to identify and/or to select one or more connectors 160*a*-160*c* for connecting with data sources (e.g., third party data source(s) 165, shared network environment(s) 170, and/or local data source(s) 175 of FIG. 1). The trigger assistant(s) 155 is configured to cause extraction of data items and/or content associated with the data items from the data sources 165-175, in response to a trigger that is associated with the data items occurring. Enrichment pipeline 180 is configured to ingest, using the content ingestion system 185, the extracted data items and/or the extracted content and to process, using the item processor 190, the extracted content to produce enrichment data, which may subsequently be ingested by content ingestion system 185. Item processor 190 may also be used to send the data items and/or enrichment data to AI system 195. In some cases, the extracting and ingestion processes may be performed within enrichment pipeline 180 via one of tenant specific model or platform subscription managed resource, the former being focused on tenant systems while the latter being focused on a platform-wide system covering multiple tenant systems.

Figure 2A:
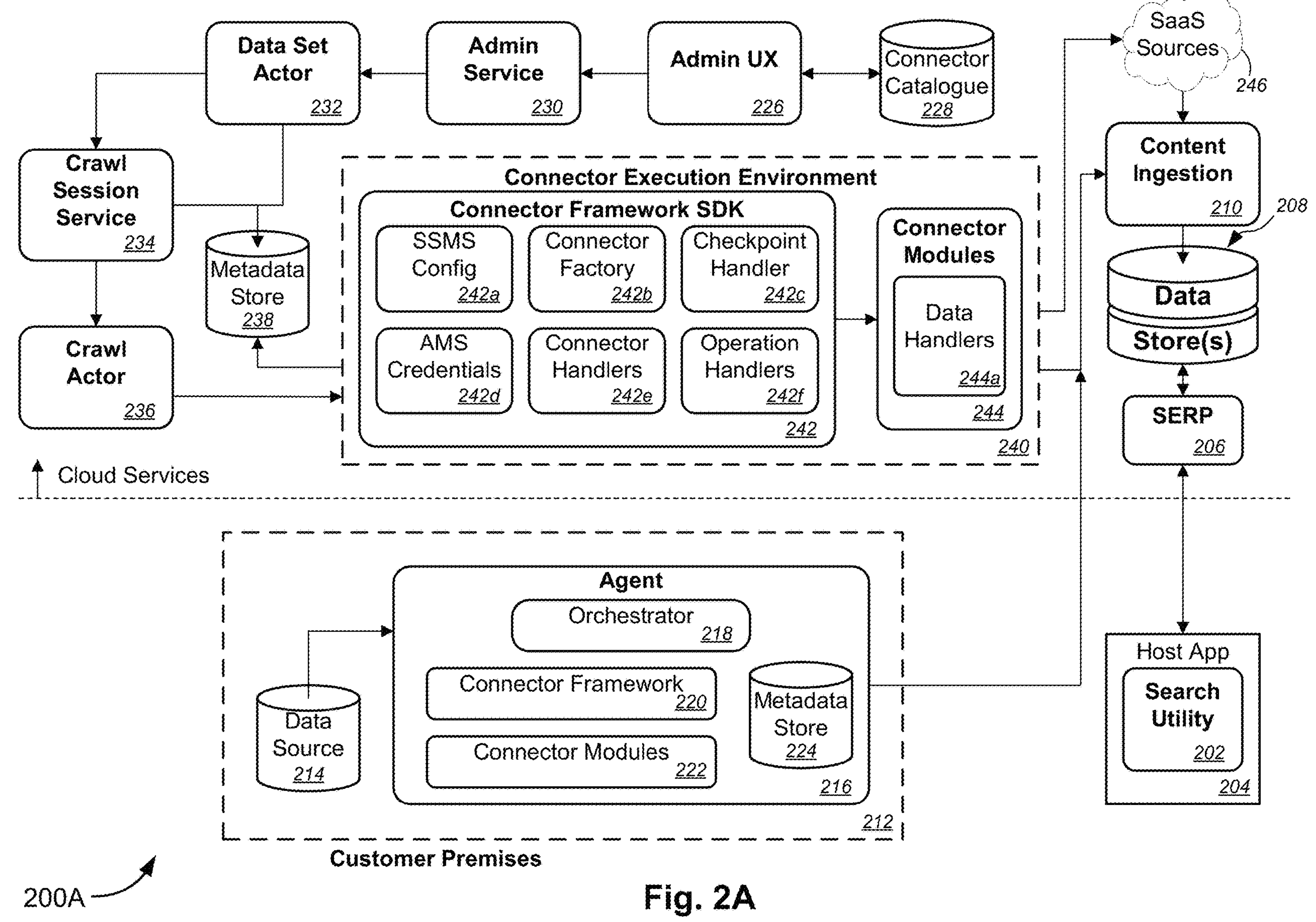
FIG. 2A depicts a block diagram illustrating an example connector architecture for implementing content enrichment of document data and data source connector content.

In operation, enrichment pipeline 180, content ingestion system 185, and/or item processor 190 (collectively, "computing system") may perform methods for implementing content enrichment of document data and data source connector content, the enrichment content being indexable, searchable, refinable, and retrievable prior to receiving a search query for the data item, as described in detail with respect to FIGS. 2A-4. For example, the following functionalities may be applied with respect to the operations of system 100 of FIG. 1. FIGS. 2A-2C as described below are directed to an example connector architecture 200A for implementing content enrichment of document data and data source connector content, an example data flow 200B for implementing pre-ingestion content enrichment, and an example data flow 200C for implementing post-ingestion content enrichment, respectively. The server(s) 115 and/or the SERP system 115 may perform generating, presenting, and/or implementing the example UX 300 of FIG. 3, which, in conjunction with the computing system, present the queried data items in the search results display field and enrichment data associated with the queried data items in the enrichment data display field. FIGS. 4A and 4B as described below are directed to the method for implementing content enrichment of document data and data source connector content.

FIG. 2A depicts a block diagram illustrating an example connector architecture 200A for implementing content enrichment of document data and data source connector content. In some embodiments, search utility 202, host app 204, SERP 206, data store(s) 208, content ingestion 210, data source 214, agent system 216, admin UX 226, connector catalogue 228, and connector execution environment or connector system 240 of FIG. 2A may be similar, if not identical, to search utility(ies) 105, host app(s) 110, SERP 135, data store(s) 140, content ingestion 185, local data source(s) 175, connector 160 or 160*c*, admin UX 145, connector catalogue 150, and connector 160, 160*a*, 160*b*, respectively, of system 100 of FIG. 1, and the description of these components of system 100 of FIG. 1 are similarly applicable to the corresponding components of FIG. 2A.

Example connector architecture 200A includes a search utility 202, a host app 204, SERP 206, a data store(s) 208, and a content ingestion system 210. Example connector architecture 200A further includes a local data source 214 and agent system 216, both located within customer premises 212. In some cases, the agent system 216 includes orchestrator 218, connector framework 220, connector modules 222, and metadata store 224. Example connector architecture 200A further includes an admin UX 226, a connector catalogue 228, an admin service system 230, a data set actor 232, a crawl session service system 234, a crawl actor 236, a metadata store 238, and a connector execution environment or connector system 240. In some examples, the connector execution environment or connector system 240 includes a connector framework software development kit ("SDK") 242 and one or more connector modules or devices 244. In examples, the connector framework SDK 242 includes a structured query language ("SQL") server management studio ("SSMS") configuration system 242*a*, a connector factory 242*b*, a checkpoint handler 242*c*, an application management service ("AMS") credentials system 242*d*, one or more connector handlers 242*e*, and one or more operation handlers 242*f*. In some cases, the one or more connector modules or devices 244 include one or more data handlers 244*a*. In some examples, as denoted by dashed line and arrow denoted "Cloud Services," SERP 206, data store(s) 208, content ingestion 210, admin UX 226, connector catalogue 228, admin service system 230, data set actor 232, crawl session service 234, crawl actor 236, metadata store 238, connector execution environment 240, and SaaS sources 246 may be part of the cloud services.

With reference to FIG. 2A, in operation, search utility 202 of host app 204 may receive a search query for a data item. In response to receiving the search query, the SERP 206 may search a search index of data store(s) 208 for the data item and for enrichment data associated with the data item, the enrichment data is pre-ingested in the data store using content ingestion system 210, in some cases, in response to a trigger associated with the data item (e.g., using trigger assistance(s) 155 of FIG. 1). For pre-ingestion of data items available from local data sources located in customer premises 212, agent system 216—using orchestrator 218, connector framework 220, and connector modules 222—may access data associated with the data item from local data source 214 and/or metadata store 224, and such data may be processed as enrichment data for the data item. The enrichment data may be pre-ingested by the content ingestion system 210 in a manner that is indexable, searchable, refinable, and retrievable prior to receiving the search query.

For pre-ingestion of data items available from third party sources (or shared network environments), admin UX 226 may provide an administrator with options and tools for accessing a connector catalogue 228 to identify and/or to select one or more connectors for connecting with data sources (e.g., third party data source(s) 165 and/or shared network environment(s) 170 of FIG. 1). In response to identifying and/or selecting the one or more connectors, the admin UX 226 may cause admin service system 230 to instruct data set actor 232 to register a data set and/or to initiate a full or incremental crawl session using crawl session service system 234. In examples, crawl session service system 234 may create a crawl of data sources, which may cause a crawl actor 236 to evaluate a query via connector execution environment 240 and via software as a service ("SaaS") sources 246. Alternatively or additionally, crawl session service system 234 may access metadata store 238 (in some cases, via connector execution environment

240). In some examples, SSMS configuration system 242*a* configuration system 242*a* manages configurations of SQL servers or other data sources (e.g., third party data source(s) 165 and/or shared network environment(s) 170). In examples, connector factor 242*b* creates or modifies connectors for connecting with the SQL servers or other data sources. Checkpoint handler 242*c* handles checkpoint connections with the SQL servers or other data sources. AMS credentials system 242*d* manages credentials of apps. Connector handlers 242*e* and operation handlers 242*f* handle the connectors and operations of the connectors, respectively, with the SQL servers or other data sources. Data handlers 244*a* of connector modules 244 handle data using the connector framework SDK components 242*a*-242*f* to provide content ingestion (via content ingestion system 210), including putting or adding, patching or modifying, and/or deleting data items and/or enrichment data for data items. In FIG. 2A, the arrow between the connector execution environment 240 and the content ingestion 210 denotes content ingestion of data items from data sources in a shared network environment(s) (e.g., shared network environment(s) 170 of FIG. 1). The arrows between the connector execution environment 240 and the content ingestion 210, via SaaS sources 246, denote content ingestion of data items from third party data sources (e.g., third party data sources 165 of FIG. 1).

Figure 2C:
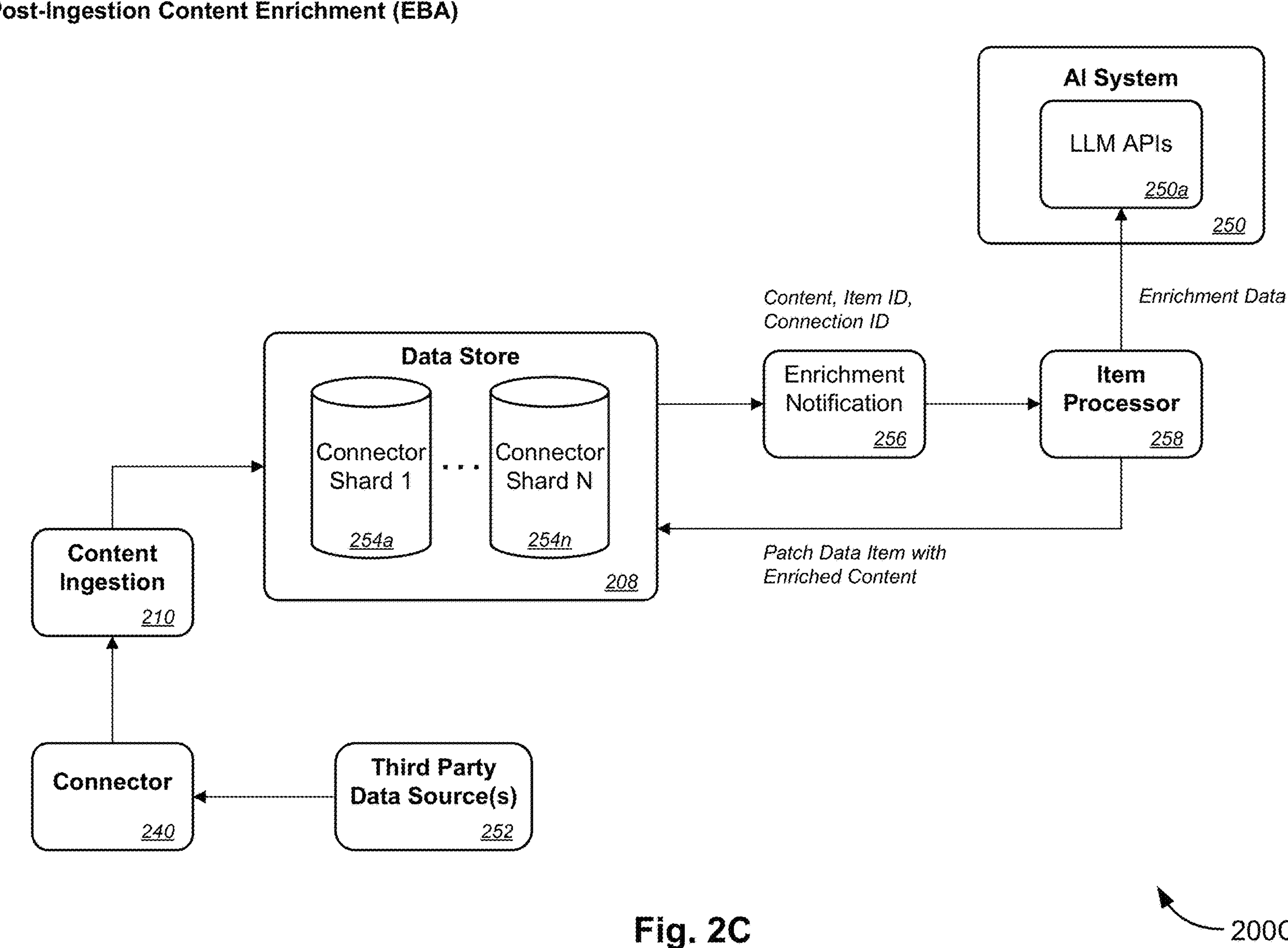

FIGS. 2B and 2C depict block diagrams illustrating example data flows 200B and 200C for implementing pre-ingestion content enrichment and post-ingestion content enrichment. In some embodiments, data store 208, content ingestion 210, connector system 240, connector framework SDK 242 and connector modules or devices 244, AI system 250, LLM APIs 250*a*, third party data source(s) 252, and item processor 258 of FIGS. 2B and 2C may be similar, if not identical, to data store(s) 140, content ingestion 185, connector 160, connector 160*a*, AI system 195, LLM APIs 195*a*, third party data source(s) 165, and item processor 190, respectively, of system 100 of FIG. 1, and the description of these components of system 100 of FIG. 1 are similarly applicable to the corresponding components of FIGS. 2B and 2C.

With reference to FIG. 2B, example data flow 200B of pre-ingestion of content enrichment is shown. In examples, connector framework SDK 242 manages configurations of one or more data sources (e.g., third party data source(s) 165 and/or shared network environment(s) 170), creates or modifies connectors for connecting with the one or more data sources, handles checkpoint connections with the one or more data sources, manages credentials of apps, and handles connectors and operations of the connectors. Data handlers 244*a* of connector modules 244 sends searchable data items with extracted content from the one or more data sources to a synchronization ("sync") handler base system 248, which adds, modifies, and/or deletes enrichment data that is populated into schema file properties of the data item (e.g., enrichment data field of the schema file of the data item) via content ingestion system 210. The synch handler base system 248 may access and relay at least some of the enrichment data from the content ingestion system 210 to the AI system 250. In some cases, at least a portion of the enrichment data-including summarization data, classification data, data for sentiment analysis of content, entity extraction data, insights data, task data associated with item properties, and/or relationship data with other data items—is generated using an LLM, prior to queries of the data item received by the LLM API(s) 250*a* of the AI system 250. In response to receiving a subsequent query from a requesting entity (e.g., search utility 105 and/or 202)), the LLM API(s) 250*a* of the AI system 250 provides the at least a portion of the enrichment data to the requesting entity.

Referring to FIG. 2C, example data flow 200C of post-ingestion of content enrichment (e.g., using an EBA (e.g., EBA 155*a* of FIG. 1)) is shown. In examples, connector 240 connects with third party data source(s) 252 (e.g., third party data source(s) 165 of FIG. 1) to extract content associated with a data item in response to a trigger. In some examples, the trigger is associated with the data item, and includes one of a user input being received requesting extraction of the enrichment data, a new data item being added, the data item being updated or changed, or a related data item being added, updated, or deleted. The extracted content is ingested using content ingestion system 210 into data store 208. Connector shards 1 through N 254*a*-254*n* (collectively, "connector shards 254") of data store 208 each stores data items and/or enrichment data that are obtained from or via a corresponding connector. Enrichment notification system 256 may retrieve from at least one connector shard 254 of the data store 208 at least portions of enrichment data of the data item with which the trigger is associated, the at least portions of enrichment data including extracted content, data item identifier ("ID"), connection ID, and/or other of the enrichment data types described above. Enrichment notification system 256 may send the at least portions of enrichment data to item processor 258 (e.g., item processor 190 of FIG. 1), which may process and send the at least portions of the enrichment data to AI system 250 and/or LLM API(s) 250*a* of AI system 250. The LLM API(s) 250*a* and the AI system 250 of FIG. 2C may perform functions similar to the LLM API(s) 250*a* and the AI system 250 of FIG. 2B. In some examples, the item processor 258 patches or modifies data items with enriched content or enrichment data that are stored in the corresponding connector shard 254 of the data store 208.

Figure 3:
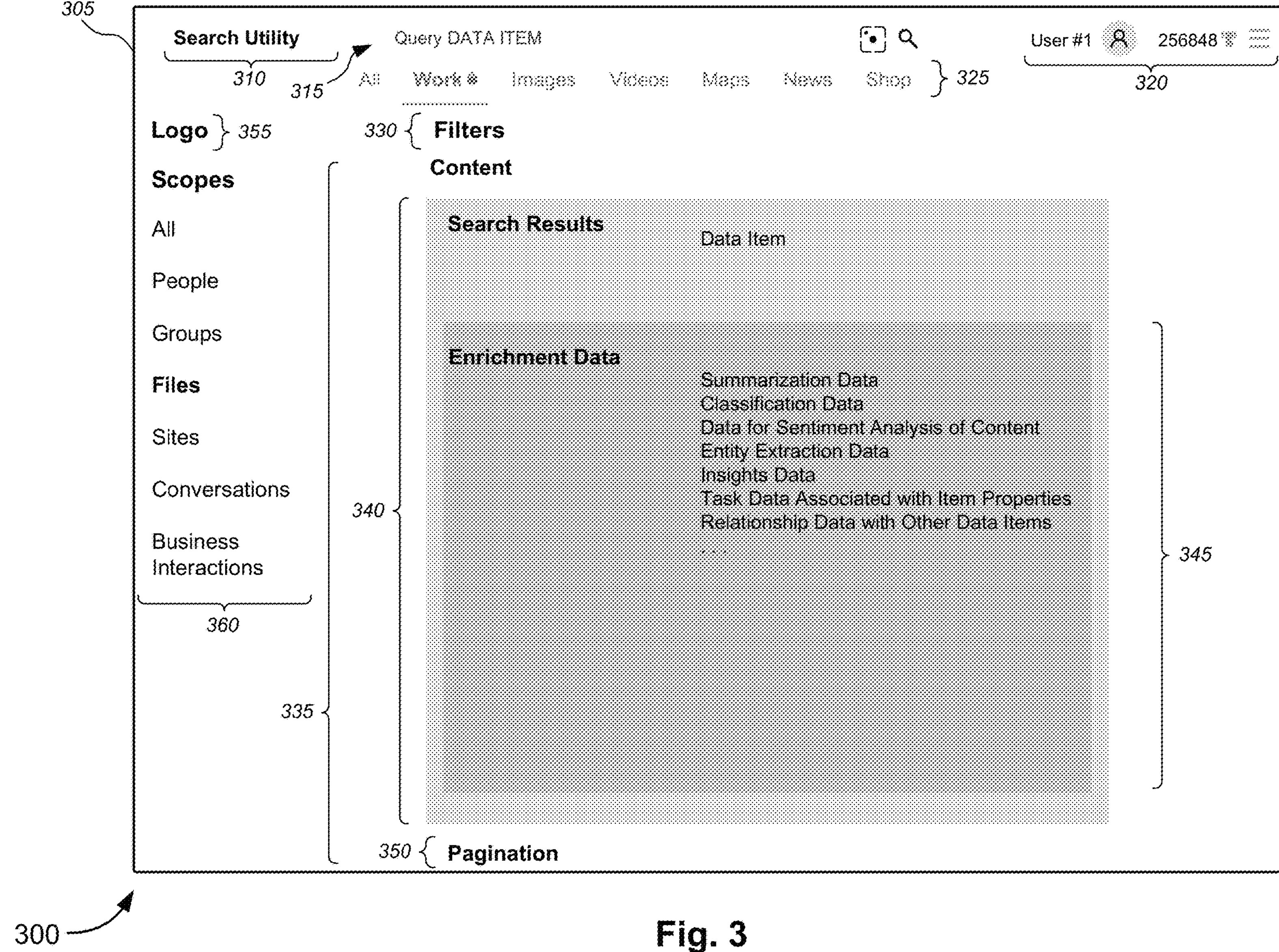
FIG. 3 depicts a diagram illustrating an example user experience ("UX") for a search utility of a host app when implementing content enrichment pipeline functionality and/or search engine results page ("SERP") functionality.

FIG. 3 depicts a diagram illustrating an example UX 300 for a search utility of a host app when implementing content enrichment pipeline functionality and/or SERP functionality.

In the non-limiting example UX 300 of FIG. 3, UI 305 includes a header portion 310, a search field 315, a user option portion 320, a search vertical list portion 325, a filter portion 330, and a result display field 335. In an example, the result display field 335 may include a search results display field 340, an enrichment data display field 345, and/or pagination 350. UI 305 may further include a logo portion 355 and/or a scopes list portion 360. A vertical, as used herein, refers to a focused view of a content type that has a tab in the menu navigation. A vertical allows users to narrow down the focus results sets. A scope, as used herein, refers to permissions or delegated permissions for a given resource that represents what a client application can access on behalf of a user. Content from a vertical or scope can be included, but does not need to be, in an "All" vertical or scope (e.g., 3$^{rd}$ party content). In an example, the plurality of search verticals includes tabs on a SERP that show results of a specific type of result among a plurality of types of results or results from selected sources in response to the user search query.

In some examples, the UI 305 is associated with a search utility of a host app (e.g., search utility 105 of host app 110 of FIG. 1). In an example, header portion 310 displays a name of the search utility, e.g., as shown in FIG. 3. The search field 315 provides an input field for receiving a user search query, which may include text-based search query input field (e.g., query for "DATA ITEM") and/or image-based search query input field. In an example, the user option portion 320 may include a user account function, a user reward point function, and a menu function. After processing the user search query, the SERP system (e.g., SERP system 135) may output and render the search results in the result display field 335.

The search results in the result display field 335 may be filtered by selection of search verticals 325, which may include at least one of All, Work, Images, Videos, Maps, News, and/or Shop. Selection of filters 330 may further filter the search results, e.g., by narrowing down results on the page based on filter type. In some examples, the filter types include time range (e.g., all time ranges, past 24 hours, past week, past month, past year, and custom date range), location, and/or file type. Selection of the "All" search vertical filters the search results to display all the search results within the result display field 335. Selection of the "Work" search vertical filters the search results to display work-related files or documents among the search results (or links to the work-related files or documents) within the result display field 335. In some cases, the work-related files or documents may be encrypted or otherwise secured from access by unauthorized entities. Selection of the "Images" search vertical filters the search results to display images among the search results (or links to the images) within the result display field 335. Selection of the "Videos" search vertical filters the search results to display videos among the search results (or links to the videos) within the result display field 335. Selection of the "Maps" search vertical filters the search results to display maps among the search results (or links to the maps) within the result display field 335. Selection of the "News" search vertical filters the search results to display news articles among the search results (or links to the news articles) within the result display field 335. Selection of the "Shop" search vertical filters the search results to display shop-based results, product-based results, or service-based results among the search results (or links to the shop-based results, product-based results, or service-based results) within the result display field 335.

In some examples, within the search results display field 340 (also referred to, in some cases, as a primary domain), the search results include a data item and/or one or more related data items. In examples, the data item includes one of a word processor document file, a spreadsheet document file, a presentation document file, a drawing document file, a printable format document file, an email data file, a calendar data file, a contact list document file, a contact lead document file, a database item document file, a web document file, an image file, or a video file. In some cases, the data item includes one of a local data file that is stored on a local data source, a shared data file that is accessible within a shared network environment, or a connector content file that is stored in a third party data source and that is accessible via a third party app via a connector API. In examples, the data item includes the connector content file that is accessible via the third party app via the connector API. In examples, within the enrichment data display field 345, enrichment data associated with the data item (and/or the one or more related data items) is displayed. In some examples, the enrichment data includes at least one of summarization data, classification data, data for sentiment analysis of content, entity extraction data, insights data, task data associated with item properties, or relationship data with other data items. In some instances, at least a portion of the enrichment data is generated using an LLM. In examples, the logo portion 355 displays a logo of the search utility, e.g., as shown in FIG. 3.

In some examples, the scopes list portion 360 includes scopes including at least one of All, People, Groups, Files, Sites, Conversations, and/or Business Interactions. The scopes 360 may be similar to the search verticals of UXs of other search utilities (not shown). In some examples, selection of the "All" scope filters the search results to display all the search results within the result display field 335. Selection of the "People" scope filters the search results to display a list of people among the search results (or links to information associated with the people in the list) within the result display field 335. Selection of the "Groups" scope filters the search results to display groups among the search results (or links to the groups) within the result display field 335. Selection of the "Files" scope filters the search results to display files or documents among the search results (or links to the files or documents), or display of data items (in the case of FIG. 3, in which the "Files" scope is selected as denoted by bold-faced highlighting), within the result display field 335. In some examples, the files or documents may include the data items described above and/or may include at least one of word processing documents, spreadsheet documents, presentation documents, note-taking documents, document format files, image files, video files, website documents, and/or news documents. Selection of the "Sites" scope filters the search results to display websites among the search results (or links to the websites) within the result display field 335. Selection of the "conversations" scope filters the search results to display conversations among the search results (or links to the conversations) within the result display field 335. Selection of the "business interactions" scope filters the search results to display business interactions among the search results (or links to the business interactions) within the result display field 335.

Figure 4A:
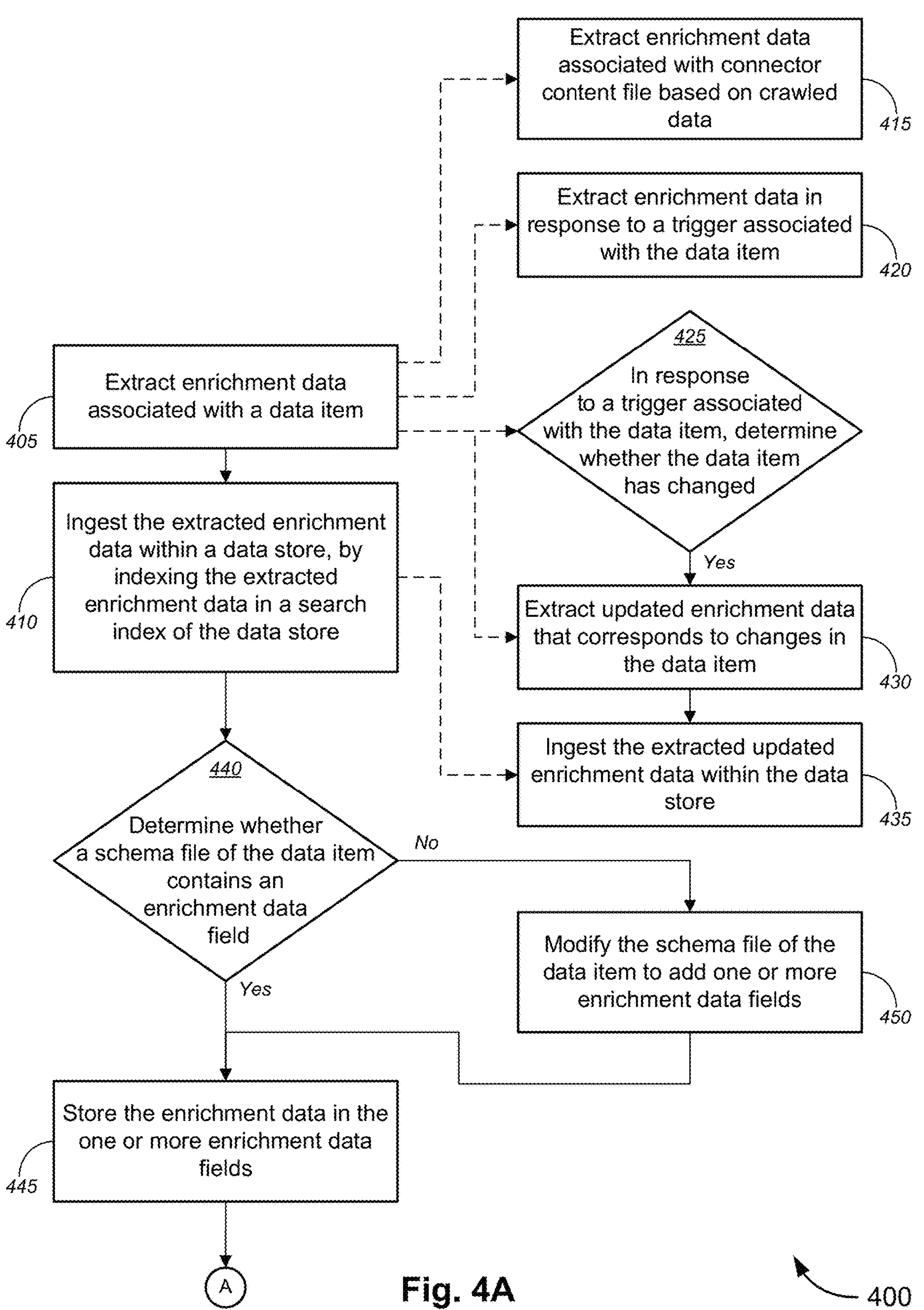
FIGS. 4A and 4B depict an example method for implementing content enrichment of document data and data source connector content.
Figure 4B:
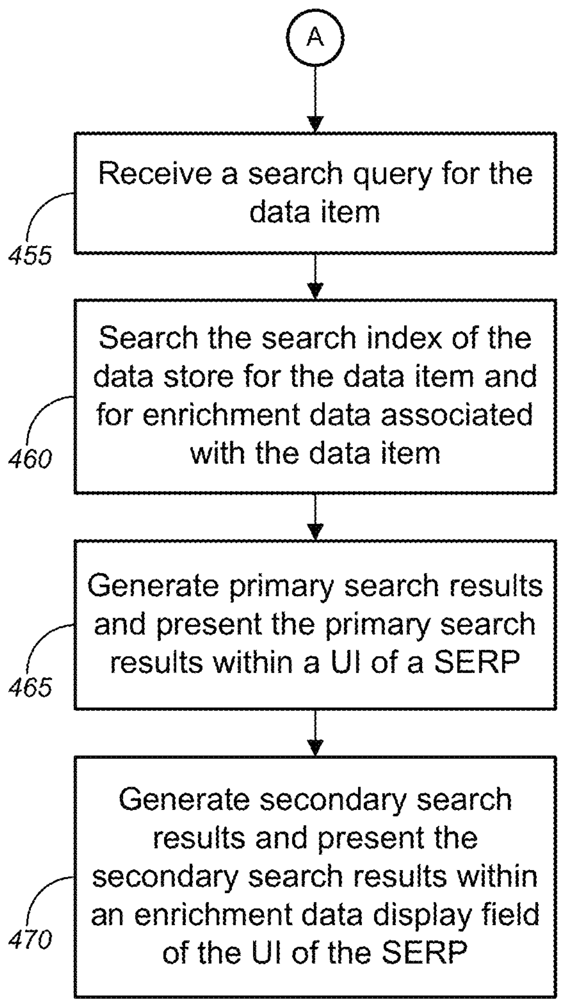

FIGS. 4A and 4B depict an example method 400 for implementing content enrichment of document data and data source connector content. Method 400 of FIG. 4A continues onto FIG. 4B following the circular marker denoted, "A."

At operation 405, enrichment data associated with a data item is extracted. At operation 410, the extracted enrichment data is ingested within a data store, by indexing the extracted enrichment data in a search index of the data store. In some examples, indexing the extracted enrichment data includes generating a listing within the search index, the listing being generated to be searchable and refinable using a search engine, the extracted enrichment data being retrievable via the search engine. In examples, the data item includes one of a word processor document file, a spreadsheet document file, a presentation document file, a drawing document file, a printable format document file, an email data file, a calendar data file, a contact list document file, a contact lead document file, a database item document file, a web document file, an image file, or a video file. In some cases, the data item includes one of a local data file that is stored on a local data source, a shared data file that is accessible within a shared network environment, or a connector content file that is stored in a third party data source and that is accessible via a third party app via a connector API. In examples, the data item includes the connector content file that is accessible via the third party app via the connector API. In some cases, extracting the enrichment data (at operation 405) includes crawling the third party data source via the connector API to produce crawled data, and extracting the enrichment data associated with the connector content file based on the crawled data (at operation 415). In some instances, at least a portion of the enrichment data is generated using an LLM. In some examples, the enrichment data includes at least one of summarization data, classification data, data for sentiment analysis of content, entity extraction data, insights data, task data associated with item properties, or relationship data with other data items. In some cases, the extracting and ingestion processes (at operations 405 and 410) are performed within an enrichment pipeline (e.g., enrichment pipeline 180 of FIG. 1) via one of tenant specific model or platform subscription managed resource.

In examples, extracting the enrichment data (at operation 405) is performed in response to a trigger associated with the data item (at operation 420). The trigger includes one of an event-based trigger or a time-based trigger. In examples, the event-based trigger includes one of a user input being received requesting extraction of the enrichment data, a new data item being added, the data item being updated or changed, or a related data item being added, updated, or deleted. In some examples, the time-based trigger includes at least one of a set date, a set day of a week, a set time of a day, or a set repeating period. In examples, at operation 425, further in response to the trigger, determining whether the data item has changed. Based on a determination that the data item has changed, updated enrichment data that corresponds to changes in the data item is extracted (at operation 430) and the extracted updated enrichment data is ingested within the data store (at operation 435). In some cases, extracting the enrichment data (at operation 405) includes determining whether the data item has changed (at operation 425) and, if so, extracting the updated enrichment data (at operation 430). In some instances, ingesting the extracted enrichment data (at operation 410) includes ingesting the extracted updated enrichment data (at operation 435).

At operation 440, method 400 includes determining whether a schema file of the data item contains an enrichment data field. Based on a determination that a schema file of the data item contains an enrichment data field, method 400 includes storing the enrichment data in the one or more enrichment data fields (at operation 445). Based on a determination that a schema file of the data item does not contain an enrichment data field, method 400 includes modifying the schema file of the data item to add one or more enrichment data fields (at operation 450) and storing the enrichment data in the one or more enrichment data fields (at operation 445). In some examples, the schema file is stored in the data store. Method 400 may continue onto the process at operation 455 in FIG. 4B, following the circular marker denoted, “A.”

In examples, ingestion of the extracted enrichment data (at operation 410) is performed prior to receiving a search query for the data item via the search engine. At block 455 in FIG. 4B (following the circular marker denoted, “A,” in FIG. 4A), method 400 may include receiving a search query for the data item. At operation 460, method 400 includes searching the search index of the data store for the data item and for enrichment data associated with the data item. Method 400, at operation 465, includes generating and presenting primary search results within a UI of a SERP, the primary search results including a first link to the data item based on the listing of the data item in the search index, the data item being retrievable by following the first link. At operation 470, method 400 includes generating and presenting secondary search results within an enrichment data display field of the UI of the SERP, the secondary search results including one or more second links to the enrichment data based on the listing of the enrichment data in the search index, the enrichment data being retrievable by following the one or more second links. In some examples, the primary search results and the secondary search results are combined such that the enrichment data display field of the UI is merged with a portion of the UI in which the primary search results are presented. In some instances, the enrichment data is contained within an enrichment data field in a schema file of the data item. In examples, the SERP is a first SERP among a plurality of SERPs. In some examples, the UI is implemented as an adaptive card that presents the primary search results and the secondary search results in a format that conforms to a format of the first SERP and that changes to conform to a format of a second SERP among the plurality of SERPs when the primary search results and the secondary search results are presented in the second SERP. The format of the second SERP is different from the format of the first SERP.

While the techniques and procedures in method 400 are depicted and/or described in a certain order for purposes of illustration, it should be appreciated that certain procedures may be reordered and/or omitted within the scope of various embodiments. Moreover, while the method 400 may be implemented by or with (and, in some cases, are described below with respect to) the systems, examples, or embodiments 100, 200A, 200B, and 200C, and 300 of FIGS. 1, 2A, 2B, 2C, and 3, respectively (or components thereof), such methods may also be implemented using any suitable hardware (or software) implementation. Similarly, while each of the systems, examples, or embodiments 100, 200A, 200B, and 200C, and 300 of FIGS. 1, 2A, 2B, 2C, and 3, respectively (or components thereof), can operate according to the method 400 (e.g., by executing instructions embodied on a computer readable medium), the systems, examples, or embodiments 100, 200A, 200B, and 200C, and 300 of FIGS. 1, 2A, 2B, 2C, and 3 can each also operate according to other modes of operation and/or perform other suitable procedures.

Figure 5:
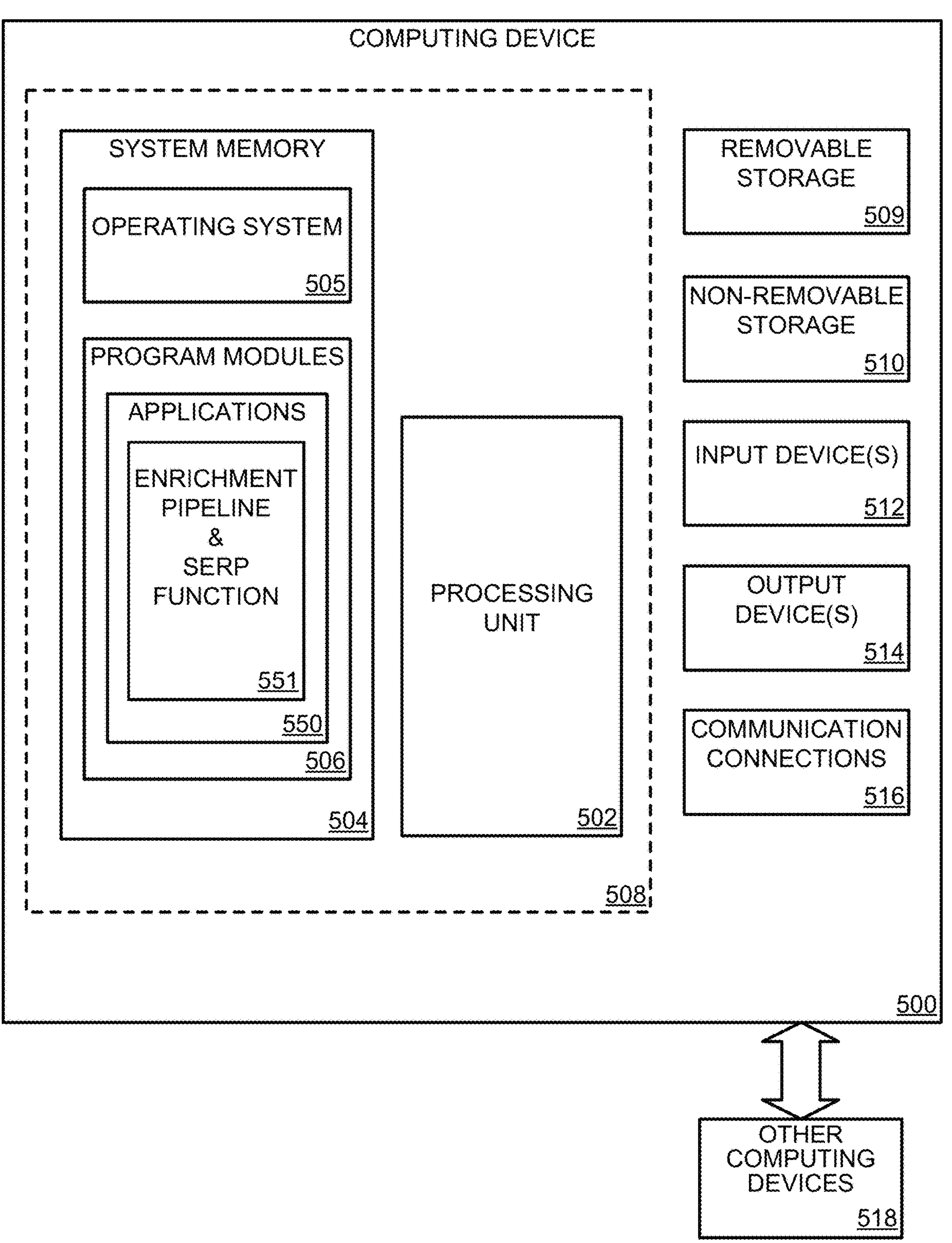
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the content enrichment of document data and data source connector content, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as enrichment pipeline and SERP function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A and 4B, or one or more operations of the system(s) and/or apparatus(es) as described with respect to FIG. 1-3, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or d direct-wired connection, and wireless media such as acoustic, RF, infrared, and other wireless media.

As should be appreciated from the foregoing, the present technology provides multiple technical benefits and solutions to technical problems. For instance, implementing enrichment of data files generally raises multiple technical problems. For example, one technical problem includes enrichment of data files at runtime during a search, which adds latency to search implementation. The present technology provides a system that implements content enrichment of document data and data source connector content, in which content and other metadata may be run through an enrichment pipeline to extract data enrichments and to ingest the data enrichments. With pre-ingestion of enrichments as content is indexed for search in a data store, such search when serving enrichments for queries either does not suffer or minimizes the latency incurred by run-time enrichments with use of conventional data search utilities. The present technology also provides EBAs and TBAs to capture any updates to entity content (e.g., the data items and connector content described above) to update the corresponding data enrichments. The data enrichments are pre-aggregated and ingested, in some cases, based on top N popular queries for a given tenant.

In an aspect, the technology relates to a system including a processing system and memory coupled to the processing system. The memory includes computer executable instructions that, when executed by the processing system, causes the system to perform operations including extracting enrichment data associated with a data item; and ingesting the extracted enrichment data within a data store, by indexing the extracted enrichment data in a search index of the data store. Indexing the extracted enrichment data includes generating a listing within the search index, the listing being generated to be searchable and refinable using a search engine, the extracted enrichment data being retrievable via the search engine.

In some examples, the data item includes one of a word processor document file, a spreadsheet document file, a presentation document file, a drawing document file, a printable format document file, an email data file, a calendar data file, a contact list document file, a contact lead document file, a database item document file, a web document file, an image file, or a video file. In some cases, the data item includes one of a local data file that is stored on a local data source, a shared data file that is accessible within a shared network environment, or a connector content file that is stored in a third party data source and that is accessible via a third party software application ("app") via a connector application programming interface ("API"). In some instances, the data item includes the connector content file that is accessible via the third party app via the connector API. Extracting the enrichment data includes crawling the third party data source via the connector API to produce crawled data, and extracting the enrichment data associated with the connector content file based on the crawled data.

In examples, at least a portion of the enrichment data is generated using a large language model. In some examples, the enrichment data includes at least one of summarization data, classification data, data for sentiment analysis of content, entity extraction data, insights data, task data associated with item properties, or relationship data with other data items.

In some instances, the extracting and ingestion processes are performed within an enrichment pipeline via one of tenant specific model or platform subscription managed resource. In some cases, extracting the enrichment data is performed in response to a trigger associated with the data item. The trigger includes one of an event-based trigger or a time-based trigger. In some examples, the event-based trigger includes one of a user input being received requesting extraction of the enrichment data, a new data item being added, the data item being updated or changed, or a related data item being added, updated, or deleted. In some cases, the time-based trigger includes at least one of a set date, a set day of a week, a set time of a day, or a set repeating period. In some instances, the operations further include, further in response to the trigger, determining whether the data item has changed; and based on a determination that the data item has changed, extracting updated enrichment data that corresponds to changes in the data item and ingesting the extracted updated enrichment data within the data store.

In some examples, the operations further include, based on a determination that a schema file of the data item does not contain an enrichment data field, modifying the schema file of the data item to add one or more enrichment data fields and storing the enrichment data in the one or more enrichment data fields. In some cases, the schema file is stored in the data store. In some instances, ingestion of the extracted enrichment data is performed prior to receiving a search query for the data item via the search engine.

In examples, the operations further include, in response to receiving a search query for the data item, searching the search index of the data store for the data item and for enrichment data associated with the data item. The operations further include generating primary search results and presenting the primary search results within a user interface ("UI") of a search engine results page ("SERP"), the primary search results including a first link to the data item based on the listing of the data item in the search index, the data item being retrievable by following the first link. The operations further include generating secondary search results and presenting the secondary search results within an enrichment data display field of the UI of the SERP, the secondary search results including one or more second links to the enrichment data based on the listing of the enrichment data in the search index, the enrichment data being retrievable by following the one or more second links.

In another aspect, the technology relates to a computer-implemented method, including, in response to a trigger associated with a data item, running the data item and metadata associated with the data item through an enrichment pipeline to extract enrichment data associated with the data item. In some cases, the trigger includes one of an event-based trigger or a time-based trigger. In some instances, the data item includes one of a local data file that is stored on a local data source, a shared data file that is accessible within a shared network environment, or a connector content file that is stored in a third party data source and that is accessible via a third party software application ("app") via a connector application programming interface ("API"). In some examples, running the data item and metadata associated with the data item through the enrichment pipeline includes determining whether a schema file of the data item contains an enrichment data field. Based on a determination that the schema file of the data item does not contain an enrichment data field, the method includes modifying the schema file of the data item to add one or more enrichment data fields; extracting the enrichment data; and ingesting the extracted enrichment data, by storing the extracted enrichment data in the one or more enrichment data fields in a manner that is indexable, searchable, refinable, and retrievable prior to receiving a search query for the data item. Based on a determination that the schema file of the data item already contains the one or more enrichment data fields, and based on a determination that the data item has changed, the method includes extracting the enrichment data, and storing the enrichment data in the one or more enrichment data fields and replacing a previously version of the enrichment data that was stored in the one or more enrichment data fields. Alternatively or additionally, based on a determination that the schema file of the data item already contains the one or more enrichment data fields, and based on a determination that the data item has changed, the method includes extracting updated enrichment data that corresponds to changes in the data item, and ingesting the extracted updated enrichment data, by storing the extracted updated enrichment data in the one or more enrichment data fields in a manner that is indexable, searchable, refinable, and retrievable prior to receiving a search query for the data item.

In some examples, extracting the enrichment data includes using a large language model to generate the enrichment data based on data associated with the data item as accessed from one or more data sources, the one or more data sources including at least one of the local data source, the shared network environment, or the third party data source.

In an aspect, the technology relates to a system including a processing system and memory coupled to the processing system. The memory includes computer executable instructions that, when executed by the processing system, causes the system to perform operations including, in response to receiving a search query for a data item, searching a search index of a data store for the data item and for enrichment data associated with the data item. The enrichment data is pre-ingested in the data store in response to a trigger associated with the data item and is pre-ingested in a manner that is indexable, searchable, refinable, and retrievable prior to receiving the search query. The operations include, based on a determination that the search index contains a listing of the data item, generating primary search results and presenting the primary search results within a user interface ("UI") of a search engine results page ("SERP"). The primary search results include a first link to the data item based on the listing of the data item in the search index, the data item being retrievable by following the first link. The operations include, based on a determination that the search index further contains a listing of the enrichment data associated with the data item, generating secondary search results and presenting the secondary search results within an enrichment data display field of the UI of the SERP. The secondary search results include one or more second links to the enrichment data based on the listing of the enrichment data in the search index, the enrichment data being retrievable by following the one or more second links.

In some examples, the primary search results and the secondary search results are combined such that the enrichment data display field of the UI is merged with a portion of the UI in which the primary search results are presented. In some cases, the enrichment data is contained within an enrichment data field in a schema file of the data item. In some instances, the enrichment data includes at least one of summarization data, classification data, data for sentiment analysis of content, entity extraction data, insights data, task data associated with item properties, or relationship data with other data items. In some examples, at least a portion of the enrichment data is generated using a large language model.

In examples, the SERP is a first SERP among a plurality of SERPs. In some cases, the UI is implemented as an adaptive card that presents the primary search results and the secondary search results in a format that conforms to a format of the first SERP and that changes to conform to a format of a second SERP among the plurality of SERPs when the primary search results and the secondary search results are presented in the second SERP. The format of the second SERP is different from the format of the first SERP.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:

a processing system; and memory coupled to the processing system, the memory comprising computer executable instructions that, when executed by the processing system, causes the system to perform operations comprising:

in response to determining that a schema file of a data item does not contain an enrichment data field, modifying the schema file to add one or more enrichment data fields;

extracting, prior to receiving search queries of the data item, enrichment data associated with the data item from crawled data of a third party data source, wherein the enrichment data comprises at least one of: summarization data or sentiment analysis data for the data item; and pre-ingesting the extracted enrichment data within a data store, wherein the pre-ingesting comprises:

transmitting, by connector modules of the system, the data item and the extracted enrichment data to a synchronization handler component;

populating the extracted enrichment data into at least one schema file property of the data item; and indexing the extracted enrichment data in a search index of the data store in response to a trigger associated with the data item, wherein indexing the extracted enrichment data comprises generating a listing within the search index, the listing being generated to be searchable and refinable using a search engine, the extracted enrichment data being retrievable via the search engine.

2. The system of claim 1, wherein the data item comprises a connector content file that is accessible via a third party software application via a connector application programming interface (API), wherein extracting the enrichment data comprises crawling the third party data source via the connector API to produce crawled data, and extracting the enrichment data associated with the connector content file based on the crawled data.

3. The system of claim 1, wherein the extracting and pre-ingestion processes are performed within an enrichment pipeline via one of tenant specific model or platform subscription managed resource.

4. The system of claim 1, wherein extracting the enrichment data is performed in response to a trigger associated with the data item, wherein the trigger comprises one of an event-based trigger or a time-based trigger, wherein the event-based trigger comprises one of a user input being received requesting extraction of the enrichment data, a new data item being added, the data item being updated or changed, or a related data item being added, updated, or deleted, wherein the time-based trigger comprises at least one of a set date, a set day of a week, a set time of a day, or a set repeating period.

5. The system of claim 4, wherein the operations further comprise:

further in response to the trigger, determining whether the data item has changed; and based on a determination that the data item has changed, extracting updated enrichment data that corresponds to changes in the data item and pre-ingesting the extracted updated enrichment data within the data store.

6. The system of claim 1, wherein modifying the schema file of the data item to add the one or more enrichment data fields comprises storing the enrichment data in the one or more enrichment data fields.

7. The system of claim 6, wherein the schema file is stored in the data store.

8. The system of claim 1, wherein the operations further comprise:

in response to receiving a search query for the data item, searching the search index of the data store for the data item and for enrichment data associated with the data item;

generating primary search results and presenting the primary search results within a user interface ("UI") of a search engine results page ("SERP"), the primary search results comprising a first link to the data item based on the listing of the data item in the search index, the data item being retrievable by following the first link; and generating secondary search results and presenting the secondary search results within an enrichment data display field of the UI of the SERP, the secondary search results comprising one or more second links to the enrichment data based on the listing of the enrichment data in the search index, the enrichment data being retrievable by following the one or more second links.

9. A computer-implemented method, comprising:

in response to a trigger associated with a data item, running the data item and metadata associated with the data item through an enrichment pipeline of a connector execution environment to extract enrichment data associated with the data item, wherein the trigger comprises one of an event-based trigger or a time-based trigger, wherein the data item comprises one of a local data file that is stored on a local data source, a shared data file that is accessible within a shared network environment, or a connector content file that is stored in a third party data source and that is accessible via a third party software application ("app") via a connector application programming interface ("API"), the connector execution environment including a data handler component configured to provide content ingestion using a connector framework of the connector execution environment;

wherein running the data item and metadata associated with the data item through the enrichment pipeline comprises:

determining whether a schema file of the data item contains an enrichment data field, and performing one of the following:

based on a determination that the schema file of the data item does not contain an enrichment data field, performing the following:

modifying, by the data handler component in response to the determination that the schema file of the data item does not contain the enrichment data field, the schema file of the data item to add one or more enrichment data fields;

extracting, prior to receiving search queries of the data item, the enrichment data from a third party data source, wherein the enrichment data comprises at least one of: classification data, entity extraction data, or insights data; and pre-ingesting the extracted enrichment data, wherein the pre-ingesting comprises:

transmitting, by connector modules, the data item and the extracted enrichment data to a synchronization handler component; and storing the extracted enrichment data in the one or more enrichment data fields in a manner that is indexable, searchable, refinable, and retrievable prior to receiving search queries for the data item; or based on a determination that the schema file of the data item already contains the one or more enrichment data fields, and based on a determination that the data item has changed, performing one or more of the following:

extracting the enrichment data prior to receiving search queries of the data item, transmitting, by the connector modules, the data item and the extracted enrichment data to a synchronization handler component, storing, by the connector modules, the extracted enrichment data in the one or more enrichment data fields, and replacing a previous version of the enrichment data that was stored in the one or more enrichment data fields; or extracting updated enrichment data that corresponds to changes in the data item, transmitting, by the connector modules, the data item and the extracted enrichment data to a synchronization handler component, and pre-ingesting the extracted updated enrichment data prior to receiving search queries of the data item, by storing, by the connector modules, the extracted updated enrichment data in the one or more enrichment data fields in a manner that is indexable, searchable, refinable, and retrievable prior to receiving search queries for the data item.

10. The computer-implemented method of claim 9, wherein extracting the enrichment data comprises using a large language model to generate the enrichment data based on data associated with the data item as accessed from one or more data sources, the one or more data sources comprising at least one of the local data source, the shared network environment, or the third party data source.

11. A system, comprising:

a processing system; and memory coupled to the processing system, the memory comprising computer executable instructions that, when executed by the processing system, causes the system to perform operations comprising:

in response to determining that a schema file of a data item does not contain an enrichment data field, modifying the schema file to add one or more enrichment data fields;

extracting enrichment data associated with the data item, wherein the enrichment data comprises at least one of: task data associated with item properties of the data item or relationship data between the data item and other data items;

pre-ingesting enrichment data associated with the data item in a data store prior to receiving any search query of the data item and in a manner that is indexable, searchable, refinable, and retrievable and in response to a trigger associated with the data item, wherein the pre-ingesting comprises:

transmitting, by connector modules of the system, the data item and the extracted enrichment data to a synchronization handler component; and populating the extracted enrichment data into at least one schema file property of the data item;

in response to receiving a search query for the data item, searching a search index of the data store for the data item and for the enrichment data associated with the data item;

based on a determination that the search index contains a listing of the data item, generating primary search results and presenting the primary search results within a user interface ("UI") of a search engine results page ("SERP"), the primary search results comprising a first link to the data item based on the listing of the data item in the search index, the data item being retrievable by following the first link; and based on a determination that the search index further contains a listing of the enrichment data associated with the data item, generating secondary search results and presenting the secondary search results within an enrichment data display field of the UI of the SERP, the secondary search results comprising one or more second links to the enrichment data based on the listing of the enrichment data in the search index, the enrichment data being retrievable by following the one or more second links.

12. The system of claim 11, wherein the primary search results and the secondary search results are combined such that the enrichment data display field of the UI is merged with a portion of the UI in which the primary search results are presented.

13. The system of claim 11, wherein the enrichment data is contained within the one or more enrichment data fields.

14. The system of claim 11, wherein at least a portion of the enrichment data is generated using a large language model.

15. The system of claim 11, wherein the SERP is a first SERP among a plurality of SERPs, and wherein the UI is implemented as an adaptive card that presents the primary search results and the secondary search results in a format that conforms to a format of the first SERP and that changes to conform to a format of a second SERP among the plurality of SERPs when the primary search results and the secondary search results are presented in the second SERP, the format of the second SERP being different from the format of the first SERP.

16. The system of claim 11, wherein a connector execution environment of the system:

performs the extracting enrichment data associated with the data item; and comprises a connector framework component for managing the connector modules for connecting with data sources comprising searchable data items.

17. The system of claim 16, wherein the connector framework component performs at least one of:

manages configurations of one or more of the data sources; or creates or modifies the connector modules for connecting with the data sources.

18. The system of claim 17, wherein the connector framework component further performs at least one of:

handling checkpoint connections with one or more of the data sources; or managing credentials of applications that interface with at least one of the connector execution environment or the data store.

19. The system of claim 11, wherein the synchronization handler component relays at least a portion of the enrichment data from a content ingestion system to an artificial intelligence (AI) system that receives the search query and searches the search index of the data store.

20. The system of claim 11, wherein the trigger associated with the data item is detected by an event-based assistant of the system and the event-based assistant performs the extracting enrichment data associated with the data item.

* * * * *